US009531000B2

(12) United States Patent
Kohlberger

(10) Patent No.: US 9,531,000 B2
(45) Date of Patent: Dec. 27, 2016

(54) BATTERY CELL, BATTERY CELL MODULE, METHOD FOR PRODUCING A BATTERY CELL MODULE, BATTERY AND MOTOR VEHICLE

(71) Applicants: Robert Bosch GmbH, Stuttgart (DE); Samsung SDI Co., Ltd., Yongin-si, Gyeonggi-do (KR)

(72) Inventor: Markus Kohlberger, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 149 days.

(21) Appl. No.: 13/975,423

(22) Filed: Aug. 26, 2013

(65) Prior Publication Data

US 2014/0065466 A1    Mar. 6, 2014

(30) Foreign Application Priority Data

Aug. 28, 2012 (DE) .................. 10 2012 215 206

(51) Int. Cl.
| | |
|---|---|
| H01M 2/30 | (2006.01) |
| H01M 2/20 | (2006.01) |
| B23P 11/00 | (2006.01) |
| H01M 2/10 | (2006.01) |
| H01M 10/0525 | (2010.01) |

(52) U.S. Cl.
CPC .............. *H01M 2/305* (2013.01); *B23P 11/00* (2013.01); *H01M 2/1077* (2013.01); *H01M 2/206* (2013.01); *H01M 10/0525* (2013.01); *H01M 2220/20* (2013.01); *Y02T 10/7011* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 2010/0047686 A1* | 2/2010 | Tsuchiya et al. ............. | 429/178 |
| 2010/0159319 A1* | 6/2010 | Gilford ......................... | 429/178 |
| 2012/0057316 A1* | 3/2012 | Kaneshige et al. ........... | 361/752 |
| 2013/0071728 A1* | 3/2013 | Shibanuma et al. .......... | 429/179 |

FOREIGN PATENT DOCUMENTS

| | | | | |
|---|---|---|---|---|
| JP | 2010-103599 | * 11/2011 | ......... | H01M 2/0404 |
| KR | 10 2006 0018326 A | 3/2006 | | |

\* cited by examiner

*Primary Examiner* — Miriam Stagg
*Assistant Examiner* — Carmen Lyles-Irving
(74) *Attorney, Agent, or Firm* — Maginot, Moore & Beck LLP

(57) ABSTRACT

A battery cell has at least one terminal configured to electrically connect the battery cell. The at least one terminal has at least two connection devices. Each of the at least two connection devices is configured to electrically connect the at least one terminal to one cell connector.

9 Claims, 4 Drawing Sheets

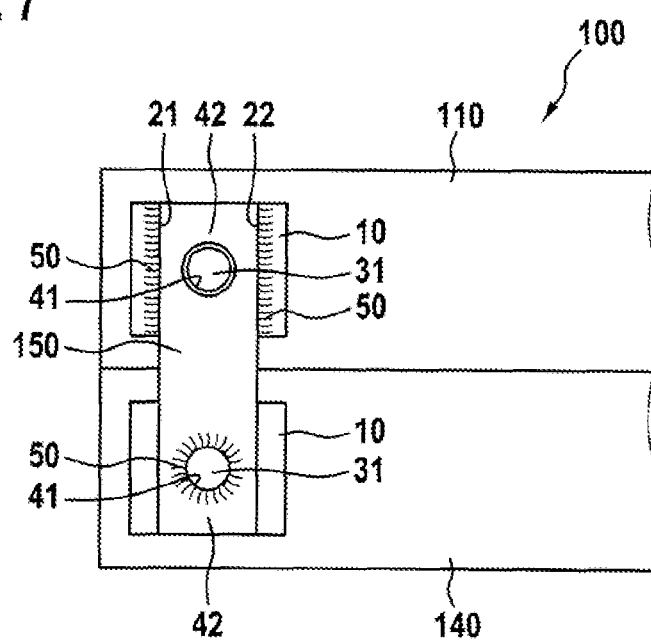

BATTERY CELL, BATTERY CELL MODULE, METHOD FOR PRODUCING A BATTERY CELL MODULE, BATTERY AND MOTOR VEHICLE

This application claims priority under 35 U.S.C. §119 to patent application no. DE 10 2012 215 206.7, filed on Aug. 28, 2012 in Germany, the disclosure of which is incorporated herein by reference in its entirety.

BACKGROUND

The present disclosure relates to a battery cell, a battery cell module having the battery cell according to the disclosure, a method for producing the battery cell module, a battery having at least one battery cell module, and a motor vehicle which has the battery cell module and/or the battery.

There is a considerable need for batteries for a wide range of applications, for example for vehicles, stationary installations, for example in wind power installations, and mobile electronics devices, for example laptops and communications devices. Very high demands are made on these batteries in respect of reliability, service life and performance.

Lithium-ion technology is predestined for a wide field of use. It is distinguished, amongst other things, by a high energy density and an extremely low level of self-discharge.

Lithium-ion cells of this type usually comprise an electrode which can reversibly incorporate lithium ions in the course of so-called intercalation or can remove them again in the course of so-called deintercalation. The intercalation takes place during the process of charging the battery cell, and the deintercalation takes place during the discharging of the battery cell for the power supply of electrical units.

It is likely that, in future, new battery systems on which very high demands are made in respect of reliability, performance and service life will come into use both in stationary applications, for example in wind power installations, in vehicles, for example in hybrid vehicles and electric vehicles, and also in the consumer sector, for example in laptops and mobile telephones in this case.

Drive batteries in hybrid vehicles, plug-in hybrid vehicles and electric vehicles are usually of modular configuration. In this case, modules are formed from at least two individual battery cells, which are interconnected in series or in parallel, and said modules are, in turn, combined to form relatively large subunits which share, for example, a common cooling device. Usually, the entire battery is ultimately formed from two or more of these subunits, wherein these modules and subunits can also be arranged one above the other over several levels, in each case depending on the installation space available. Modern battery cells, specifically lithium-ion battery cells, but also lithium-polymer battery cells or else lead-acid rechargeable batteries, have the connection terminal on one of the sides of the battery, which side is usually called the top or upper face.

When interconnecting the individual battery cells to form modules, a so-called cell connector is often fitted from above. In the case of series production, welded (for example laser welding, ultrasonic welding, friction welding etc.) or riveted connections are preferably used for this.

The connection between the individual modules is also made by means of a module connector which is often configured and fitted in a similar way to the cell connector.

A battery cell or a so-called rechargeable battery pack, which is produced from several battery cells, is considered to be at the end of its service life when it only has a specific power left and/or a specific capacity and/or exceeds a specific internal resistance. In the case of power and capacity, this limit is usually approximately when 80% of the initial value is reached, that is to say of the maximum possible value of the battery cell or the rechargeable battery pack. These limit values define the end of service life.

For reasons of efficiency, the battery cell in question or the rechargeable battery pack in question then has to be replaced. This replacement process, together with the process of connecting still functional battery cells to new battery cells, is relatively complicated and therefore cost-intensive.

KR 10 2006 018 326 A discloses a system for interconnecting battery cells, wherein a first terminal of a battery cell has a threaded bolt, and a second terminal of the battery cell has a cylindrical bolt. A cell connector can be plugged onto the cylindrical bolt and can be welded to the cylindrical casing surface of the bolt. A further cell connector can be plugged onto the threaded bolt and can be fixed there by means of a suitable screw connection, for example by means of a nut. Several battery cells can be connected using cell connectors of this kind in order to produce a battery cell module. However, when individual battery cells have to be replaced, the screw connection and/or the welded connection has to be broken again and it may be necessary to provide and install a new cell connector for connecting a remaining battery cell to a new battery cell.

SUMMARY

The disclosure provides a battery cell, in particular a lithium-ion battery cell, which has at least one terminal for electrical connection of the battery cell, wherein the terminal has at least two connection devices for electrically connecting the terminal to in each case one cell connector. In this case, the terminal is electrically conductively connected to an electrode of the battery cell.

The advantage of the battery cell according to the disclosure is, in particular, that, when a further battery cell, which is coupled to the battery cell according to the disclosure, is replaced and a remainder of a cell connector remains on a connection device of the battery cell, the other connection device is still available for connection of a new cell connector. As a result, expenditure on repairs and repair times and downtimes of a battery cell module, of which the battery cell according to the disclosure is a constituent part, can be reduced.

In one configuration variant, provision is made for at least one connection device to comprise in each case two edges which run substantially parallel to one another and between which a substantially cuboidal cell connector can be accommodated. The edges preferably run exactly parallel to one another.

In another configuration variant, provision is made for at least one connection device to have a pin, wherein the pin can be plugged into a hole which is arranged in a cell connector. That is to say, a connection device has at least one shaped element, specifically the two edges or the pin, which can be brought into contact with a shaped element, which is of dimensionally complementary configuration, of a cell connector, specifically by the edges of the cell connector making contact with the edges of the connection device or by the pin of the connection device being accommodated in a hole in the cell connector.

In this case, a battery cell in which one connection device is configured with the edges which are arranged parallel to one another, and the other connection unit is configured with the pin is not precluded by the disclosure.

In a third configuration variant, provision is made for a first connection device to comprise in each case two edges which run substantially parallel to one another and between which a substantially cuboidal cell connector can be accommodated, and for a second connection device to be arranged between the edges, said second connection device having a pin, wherein the pin can be plugged into a hole which is arranged in a cell connector.

The edges are preferably arranged exactly parallel to one another in this case too. Therefore, this configuration variant combines both connection devices on one base or projection area, and is therefore of particularly volume- and weight-saving configuration.

The disclosure also provides a battery cell module which comprises at least a first battery cell according to the disclosure and also a further battery cell and a cell connector, wherein the battery cells are electrically conductively connected to one another by means of the cell connector which is connected to one of the connection devices of the first battery cell according to the disclosure. In this case, the further battery cell can likewise be a battery cell according to the disclosure. A cell connector which preferably has an elongate and, for example, cuboidal shape is preferably used to connect the terminals of the battery cells, wherein said cell connector has, at at least one end, at least two contact devices, which differ in terms of their shape and/or position, for making contact with shaped elements, which are of dimensionally complementary configuration, of the connection devices of the battery cells. In this case, the length of the cell connector is at least 1.5 times the width of the cell connector, with the result that said cell connector clearly has an elongate shape. The electrically conductive connection between the connection devices and the cell connector is preferably realized by means of welding, in particular laser welding.

In particular, a battery cell module with a battery cell is provided, in which battery cell the respectively other connection device, which is not connected to the cell connector, is configured with the two edges, which are arranged substantially parallel to one another, or else with the pin, and a remainder of another cell connector is electrically conductively connected to this connection device. Said battery cell module is a battery cell module in which a battery cell has already been replaced, wherein a cell connector which connects battery cells has been disconnected and a remainder of this cell connector has remained in or on one of the connection devices. The new cell connector is connected to the in each case other connection device which is still available.

Another alternative of a battery cell module according to the disclosure comprises a first battery cell, which comprises the edges, which run substantially parallel to one another, as the first connection device, and the pin between the edges as the second connection device. The cell connector is accommodated between the edges of the first connection device on this first battery cell, wherein the electrically conductive connection to the cell connector is realized by means of these edges. The pin of the second connection device plugs into a hole which is arranged in the cell connector, wherein, however, the pin and the material of the cell connector, which material forms the hole, are not electrically conductively connected to one another by means of the surface of the pin. There is therefore no electrically conductive connection between the pin and the hole wall since the height of the pin is lower than the thickness of the cell connector in the case of this battery cell module. A welded seam which establishes an electrically conductive connection with the cell connector is not present on the circumference or on the end face of the pin. The reason for this is that the height of the pin was the same as the thickness of the cell connector in order to establish an electrically conductive connection with a cell connector, with the result that the end of the pin terminated with the surface of the cell connector as the pin was plugged into the hole in the cell connector. When replacing a battery cell which was previously connected to the battery cell according to the disclosure, the connection between the pin and the material in which the hole is formed was broken, for example by means of drilling or milling. That is to say, the welded connection between the pin and the cell connector was destroyed. As a result, material was at least partially removed from the pin, with the result that it now has a lower height.

However, the battery cell module can also be configured in such a way that the first battery cell again has the two edges, which run substantially parallel to one another, as the first connection device and has the pin between the edges as the second connection device, and the pin of the second connection device is inserted into a hole which is arranged in the cell connector on this first battery cell, wherein the pin and the material of the cell connector, which material forms the hole, are electrically conductively connected to one another by means of the surface of the pin, and the cell connector is positioned between the edges of the first connection device, but no electrically conductive connection to the cell connector is realized by means of these edges. There is therefore no electrically conductive connection between the edges of the connection device and the cell connector since the distance between the edges is greater than the width of the cell connector and there was no welding there. The reason for this is that the distance between the edges of the connection device was originally exactly the same size as the width of a cell connector which connected another battery cell to the first battery cell according to the disclosure. This old cell connector made lateral contact with the edges of the connection device when the old cell connector was arranged between the edges. When replacing this other battery cell, the connection between the cell connector and the material which forms the edges was broken, for example by means of milling As a result, there was an at least partial increase in the distance between the edges, with the result that said edges can now not make contact with the sides of a new cell connector, which was positioned for electrically connecting the first battery cell to a further battery cell for the purpose of creating a battery cell module, if the new cell connector has the same width as the old cell connector.

The disclosure also provides a method for producing a battery cell module which has the remainder of another cell connector on a connection device, in which method at least a first battery cell with connection devices, which comprise the edges which run parallel to one another or comprise the pin, and also a second battery cell are provided, wherein the battery cells are connected to one another by means of a first cell connector which makes electrically conductive contact with the first connection device of the first battery cell, the first cell connector between the battery cells is disconnected, with the result that a remainder of the first cell connector remains on the first connection device of the first battery cell, the second battery cell is removed from the first battery cell, and a third battery cell is positioned in relation to the first battery cell, and the first battery cell and the third battery cell are electrically conductively connected to one another by means of a second cell connector, wherein the second cell connector is electrically conductively connected to the second connection device of the first battery cell.

In order to produce a battery cell module which comprises a battery cell which has the two edges, which are arranged substantially parallel to one another, as the first connection device and a pin between the edges as the second connection device, provision is made for a second battery cell to be provided in addition to this first battery cell, wherein the battery cells are connected to one another by means of a first cell connector which makes electrically conductive contact with the first connection device or the second connection device of the first battery cell, the electrically conductive connection between the cell connector and the first connection device or the second connection device is broken, the second battery cell is removed from the first battery cell together with the first cell connector, and a third battery cell is positioned in relation to the first battery cell, and the first battery cell and the third battery cell are electrically conductively connected to one another by means of a second cell connector, wherein the second cell connector is electrically conductively connected to the second connection device or first connection device, which has not been used for connection to the first cell connector, of the first battery cell. The electrically conductive connection between the cell connector and the first connection device is preferably broken in such a way that a welded seam between the edges of the first connection device and the cell connector is ground or milled away. In this case, it is not possible to preclude edges themselves being ground or milled, with the result that it is not possible to ensure a short distance between the edges and a new cell connector which would be positioned between the edges. Accordingly, it is no longer possible to perform welding in an automated manner or in a simple manual manner between the cell connector and the edges of the first accommodation device either.

The electrically conductive connection between the cell connector and the second connection device is preferably broken in such a way that the welded seam between the pin and the material of the cell connector, which material forms the hole, is ground away, drilled away or milled away. In this case, it is not possible to preclude the pin itself being ground or milled or drilled away, with the result that it is not possible to ensure a close distance between the wall of the pin and the hole wall in a new cell connector which would be positioned around the pin. Accordingly, it is no longer possible to form a welded seam in an automated manner or in a simple manual manner in this case either.

The disclosure also provides a battery which comprises a plurality of the battery cell modules according to the disclosure.

A motor vehicle is additionally provided, it being possible for said motor vehicle to be, in particular, a motor vehicle which can be driven by an electric motor and which has at least one battery cell module according to the disclosure and/or a battery according to the disclosure, wherein the battery cell module or the battery is connected to a drive system of the motor vehicle.

BRIEF DESCRIPTION OF THE DRAWINGS

The present disclosure will be explained in the text which follows with reference to the exemplary embodiments which are illustrated in the accompanying drawings, in which:

FIG. 7 shows a plan view of two battery cell portions according to the disclosure which are assembled to form another battery cell module.

DETAILED DESCRIPTION

Figure 1:
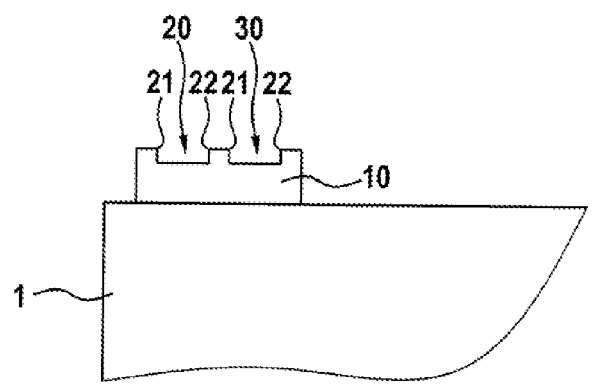
FIG. 1 shows a portion of a battery cell according to the disclosure in a first configuration variant.
Figure 2:
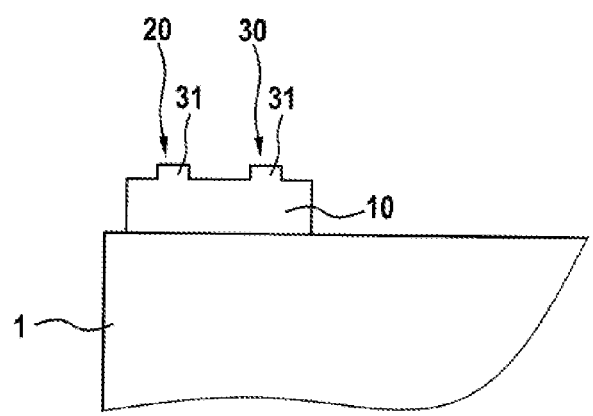
FIG. 2 shows a portion of a battery cell according to the disclosure in a second configuration variant.
Figure 3:
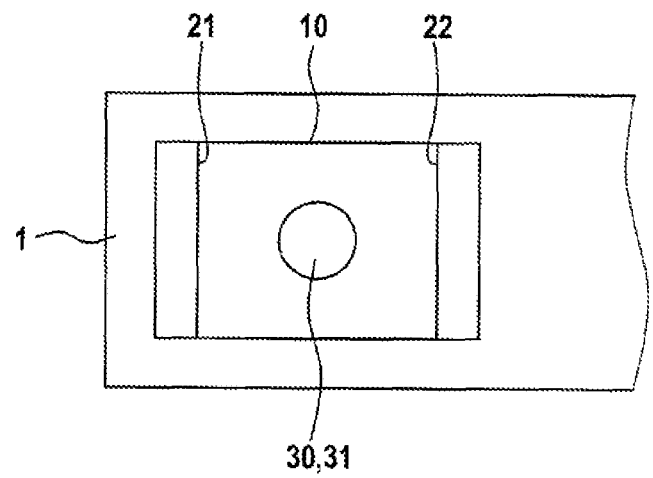
FIG. 3 shows a plan view of a portion of a battery cell according to the disclosure in a third configuration variant.

A battery cell 1 according to the disclosure has in each case a first connection device 20 and a second connection device 30 on in each case one terminal 10. FIGS. 1 to 3 in each case show different configurations of the connection devices 20, 30.

In FIG. 1, a first connection device 20, which is formed by a first edge 21 and a second edge 22, and also a second connection device 30, which is formed by a first edge 21 and by a second edge 22, are provided on the terminal 10. A cell connector can be positioned between the respective first edge 21 and second edge 22 and can be welded to the edges 21, 22 in order to connect the terminal 10 of the battery cell 1 to a peripheral electrical device or else to a further battery cell.

The configuration variant of the battery cell 1 according to the disclosure which is shown in FIG. 2 has a first connection device 20 and a second connection device 30 on the terminal 10, wherein the first connection device 20 is formed by a preferably cylindrical pin 31 and the second connection device 30 is also formed by a preferably cylindrical pin 31. These pins can be plugged into cell connectors through holes and can be welded to said cell connectors in the region of the area around the hole.

FIGS. 1 and 2 show that the two connection devices 20, 30 are arranged next to one another.

FIG. 3 shows a combination of the terminals 10 which are illustrated in FIGS. 1 and 2, wherein in the case of the terminal 10 which is illustrated in FIG. 3, the first connection device 20 is formed by the two edges 21, 22 which are arranged substantially parallel to one another, and the second connection device 30 in the form of the pin 31 is arranged between the first edge 21 and the second edge 22. This configuration variant has the advantage of a highly weight- and volume-saving construction.

Figure 4:
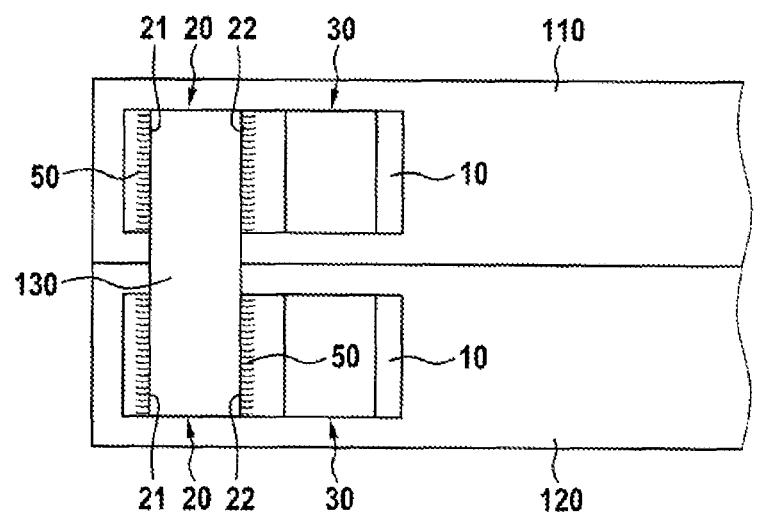
FIG. 4 shows a plan view of two battery cells according to the disclosure which are combined to form one battery cell module.
Figure 5:
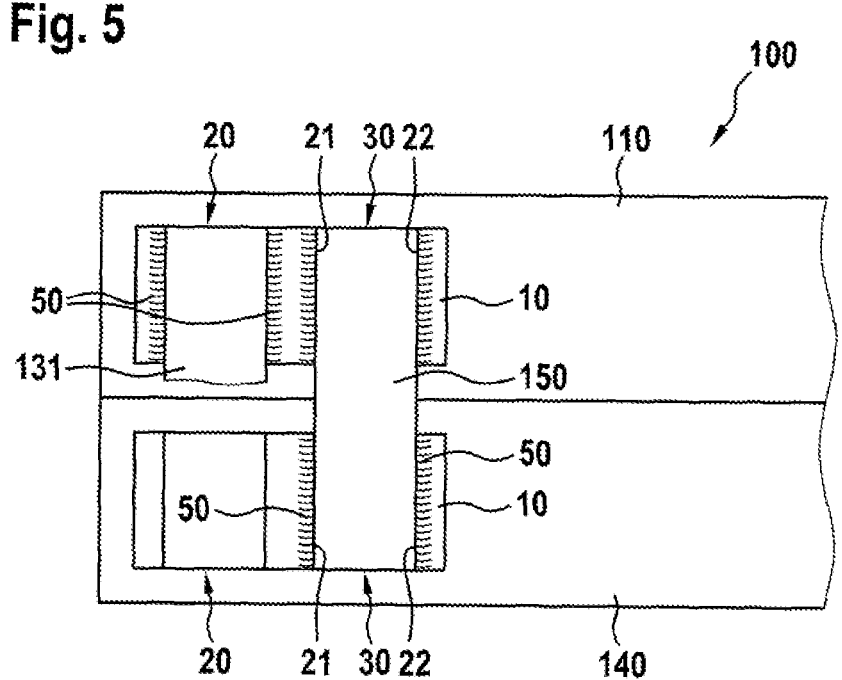
FIG. 5 shows a plan view of two battery cells according to the disclosure which are combined to form another battery cell module.

FIGS. 4 and 5 show how a battery cell 1 according to the disclosure as shown in FIG. 1 can be used according to the disclosure.

FIG. 4 shows a battery cell module, in which a first battery cell 110 according to the disclosure and a second battery cell 120 according to the disclosure are positioned next to one another, and a first cell connector 130 electrically conductively connects the respectively first connection device 20 of the first battery cell 110 and the second battery cell 120, specifically by means of welded seams 50 on the respective first edges 21 and second edges 22. In the event of it being necessary to replace the second battery cell 120 with a functional battery cell, the first cell connector 130 is disconnected according to the disclosure, with the result that a remainder 131 of the first cell connector 130 remains in the first connection device 20 of the first battery cell 110, as is illustrated in FIG. 5. FIG. 5 also shows that a functional third battery cell 140 has been assigned to the first battery cell 110 instead of the second battery cell 120 which is illustrated in FIG. 4. In order to realize the electrically conductive connection between these two battery cells 110, 140, a second cell connector 150 connects the respective second connection devices 30 of the first battery cell 110 and the third battery cell 140. The first connection device 20 of the third battery cell 140 remains free in this case.

Therefore, it is possible to replace a battery cell of a battery cell module in a simple and cost-effective manner. When replacing a battery cell in a battery cell module which has battery cells according to FIG. 2, exactly the same procedure as described in relation to FIGS. 4 and 5 is followed, only with the difference that the welding for realizing the electrically conductive connection to the cell connector is performed between the respective pin 31 and the material 42, in which the hole is formed, of the respective cell connector 40.

Figure 6:
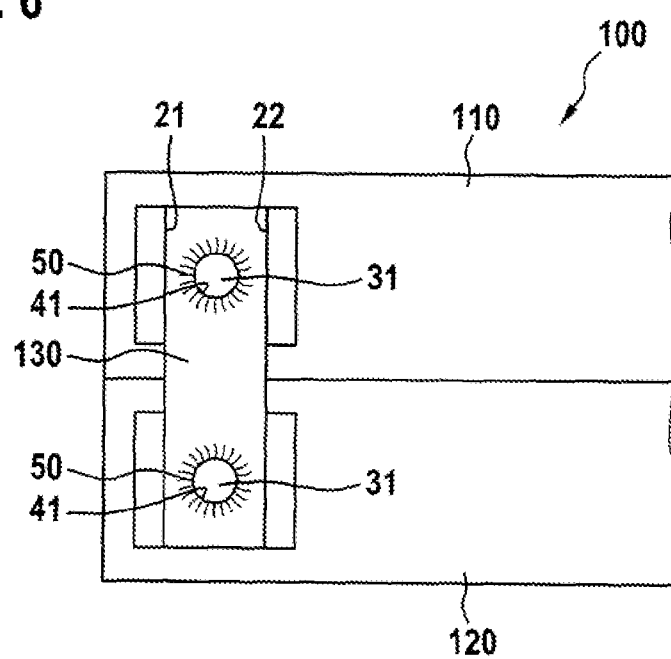
FIG. 6 shows a plan view of two battery cell portions according to the disclosure which are assembled to form one battery cell module in a second embodiment.

If, however, the battery cells in which the first connection device 20 and the second connection device 30 are arranged on a base area or a projection area, as illustrated in FIG. 3, are used in the battery cell module, a first battery cell 110 and a second battery cell 120 are provided, as illustrated in FIG. 6, wherein said first battery cell and second battery cell form a battery cell module 100. It can be seen that the two battery cells 110, 120 are connected to a first cell connector 130 by means of the respectively second connection device 30 and the associated pins 31 which plug into the holes 41 in the first cell connector 130. In this case, the electrically conductive connection is realized between the pin 31 and the respective material 42 in which the hole 41 is formed.

When it is necessary to replace the second battery cell 120, the welded seam 50 between the pin 31 of the first battery cell 110 and the first cell connector 130 is destroyed, for example by means of drilling or milling. As a result, the first cell connector 130 together with the second battery cell 120 can be removed from the first battery cell 110 and disposed of.

In order to produce a battery cell module 100 according to the disclosure, as illustrated in FIG. 7, a third battery cell 140 is now assigned to the first battery cell 110, and a second cell connector 150 is connected to the respective terminals 10 of the first battery cell 110 and of the third battery cell 150. In this case, the second cell connector 150 is connected to the second connection device 30 of the third battery cell 140 and therefore to the pin 31 which, in turn, is welded to the material 42, in which the hole 41 is formed, by means of a welded seam 50.

However, as a result of the pin 31 of the second connection device 30 of the first battery cell 110 having being mechanically processed beforehand, it is not possible to ensure that the distance between the outer wall of the pin 31 and the material 42, in which the hole is formed, of the second cell connector 150 is small enough to be able to likewise produce an electrically conductive connection in an automated manner or in a manually simple manner between the terminal 10 of the first battery cell 110 and the second cell connector 150. For this reason, the electrically conductive connection between the terminal 10 of the first battery cell 110 and the second cell connector 150 is formed by means of welded seams 50 which connect the first edge 21 and also the second edge 22 of the first connection device 20 of the first battery cell 110 to the second cell connector 150.

In this case, the disclosure is not restricted to the original connection of two battery cells being realized by means of a pin and a hole, as illustrated in FIGS. 6 and 7, and, after a battery cell has been replaced, the electrical connection can be implemented using the second cell connector by means of welded seams on the pin of one battery cell and the edges of the other battery cell, but provision can also be made for the original electrical connection to have been made only by means of the edges of the first connection device or else by means of a combination of realizing the electrically conductive connection by means of the first connection device on one battery cell and by means of the other connection device on the other battery cell.

Accordingly, a battery cell module according to the disclosure can also be configured in such a way that it uses the respectively first or second connection device in order to realize the electrical connection of the battery cell on the two battery cells or else conversely, after the non-functional battery cell has been replaced, uses the pin 31 in order to establish the electrical connection on the remaining first battery cell 110, and does not use the first edge 21 and second edge 22 of the first connection device 20 in order to establish the electrical connection.

The method described with reference to FIGS. 6 and 7 and the battery cell modules 100 which are produced using said method have the advantage that a terminal 10 of a battery cell remaining in the battery cell module, in spite of connection of a further battery cell and mechanical processing of one of the connection devices, can further be used in a simple and cost-effective manner for connection of a replacement battery cell, even though the electrically conductive connection is realized by means of welded seams.

What is claimed is:

1. A battery cell, comprising:
    at least one terminal including at least two connection devices each configured (i) to electrically connect the at least one terminal to a cell connector, and (ii) to mechanically connect the at least one terminal to the cell connector,
    wherein the at least two connection devices are configured such that at least one of (i) a first electrically conductive connection is established between one connection device and the cell connector, without establishing an electrically conductive connection between another connection device and the cell connector, and (ii) a second electrically conductive connection is established between the other connection device and the cell connector, without establishing an electrically conductive connection between the one connection device and the cell connector, and
    wherein the at least two connection devices are identical.

2. The battery cell according to claim 1, wherein:
    the one connection device includes two edges parallel to one another and a planar surface extending from one edge to another edge,
    the two edges and the planar surface define a space, and
    the cell connector is positionable in the space and is cuboidal.

3. The battery cell according to claim 1, wherein the one connection device of the at least two connection devices includes a pin configured to be plugged into a hole arranged in a respective cell connector.

4. A battery cell module, comprising:
    at least one cell connector;
    a first battery cell including at least one terminal configured to electrically connect the first battery cell to the at least one cell connector, the at least one terminal including at least two connection devices each configured (i) to electrically connect the at least one terminal to the at least one cell connector, and (ii) to mechanically connect the at least one terminal to the at least one cell connector; and a further battery cell wherein the first battery cell and the further battery cell are electrically conductively connected to one another via the at least one cell connector, wherein the at least one cell connector is connected to a first connection device of the at least two connection devices of the first battery cell, and wherein the at least two connection devices are identical.

5. The battery cell module according to claim 4, wherein:

a second connection device of the at least two connection devices is formed on the first battery cell, the second connection device including two edges parallel to one another and a planar surface extending from one edge to another edge so as to define a space bordered by the two edges and the planar surface, the at least one cell connector configured to be positioned in the space, and a remainder of another cell connector is (i) electrically conductively connected to the second connection device, (ii) mechanically connected to the second connection device, and (iii) mechanically disconnected from the first connection device.

6. The battery cell module according to claim 4, wherein a plurality of the battery cell modules are included in a battery.

7. The battery cell module according to claim 6, wherein at least one of (i) at least one battery cell module of the plurality of battery cell modules, and (ii) the battery are connected to a drive system of a motor vehicle to drive the motor vehicle.

8. The battery cell of claim 1, wherein the battery cell is a lithium-ion battery cell.

9. The battery cell according to claim 4, wherein the at least two connection devices each extend from the same planar surface of the at least one terminal.

* * * * *